April 10, 1928.

F. J. KRISTOFEK ET AL 1,665,372

ENGINE TURNING MACHINE

Filed March 24, 1923   12 Sheets-Sheet 1

Inventors: Frank J. Kristofek
Walter F. Benson
by: *[signature]*
Attorney

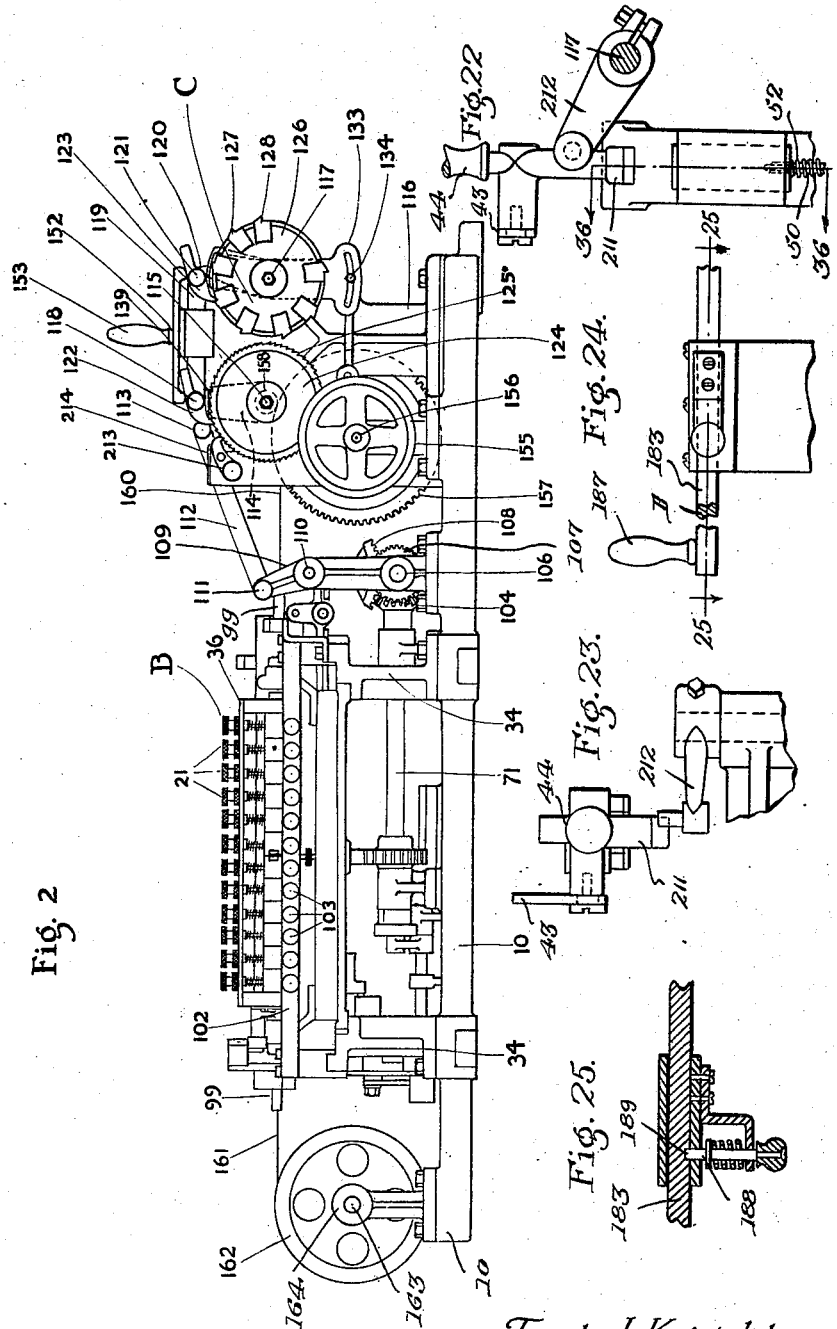

April 10, 1928.

F. J. KRISTOFEK ET AL 1,665,372

ENGINE TURNING MACHINE

Filed March 24, 1923          12 Sheets-Sheet 3

Inventors: Frank J. Kristofek
Walter F. Benson
by: Arnau Fische
Attorney

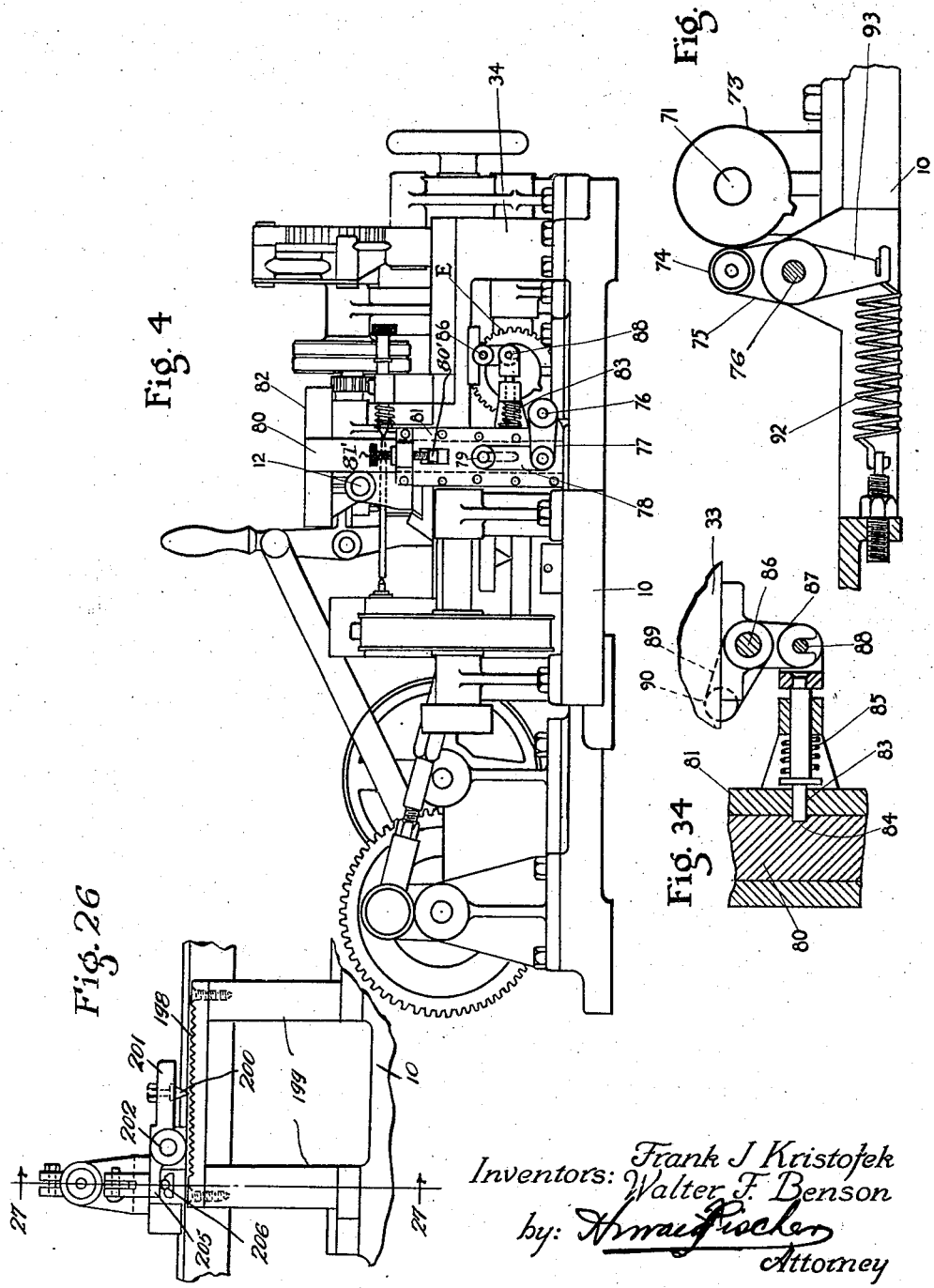

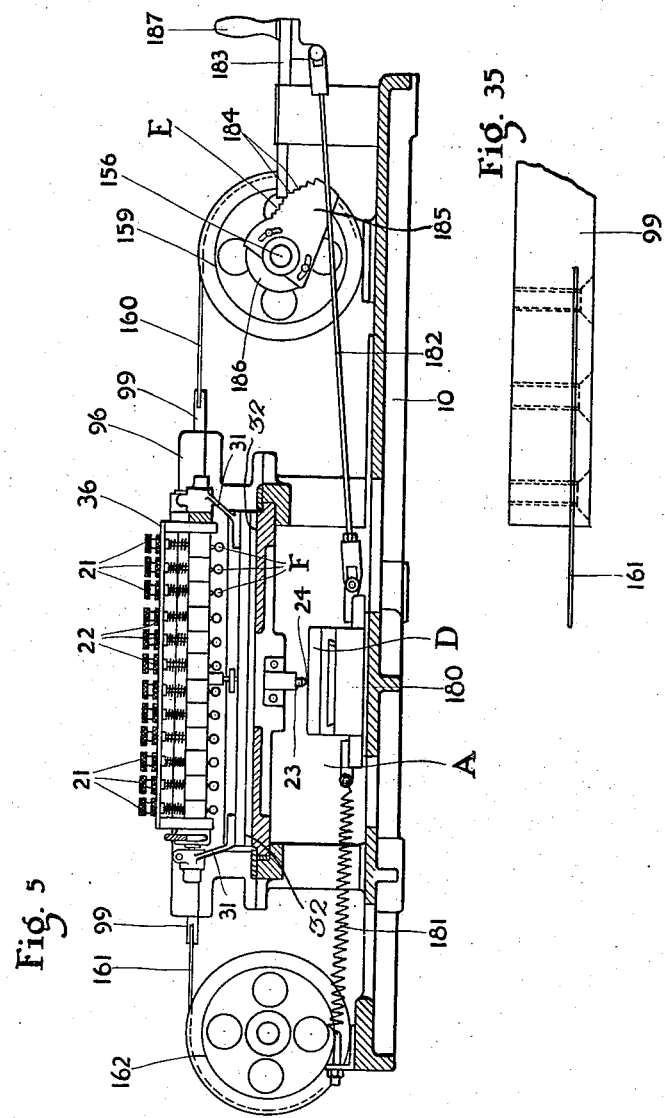

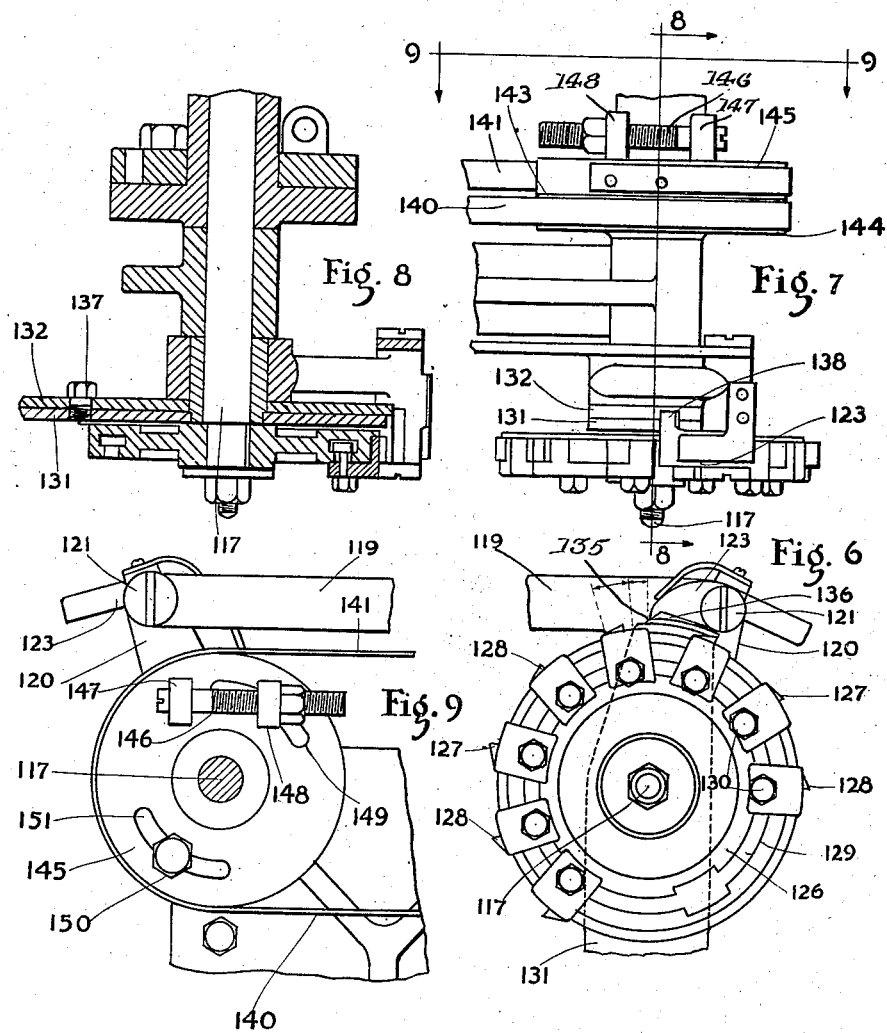

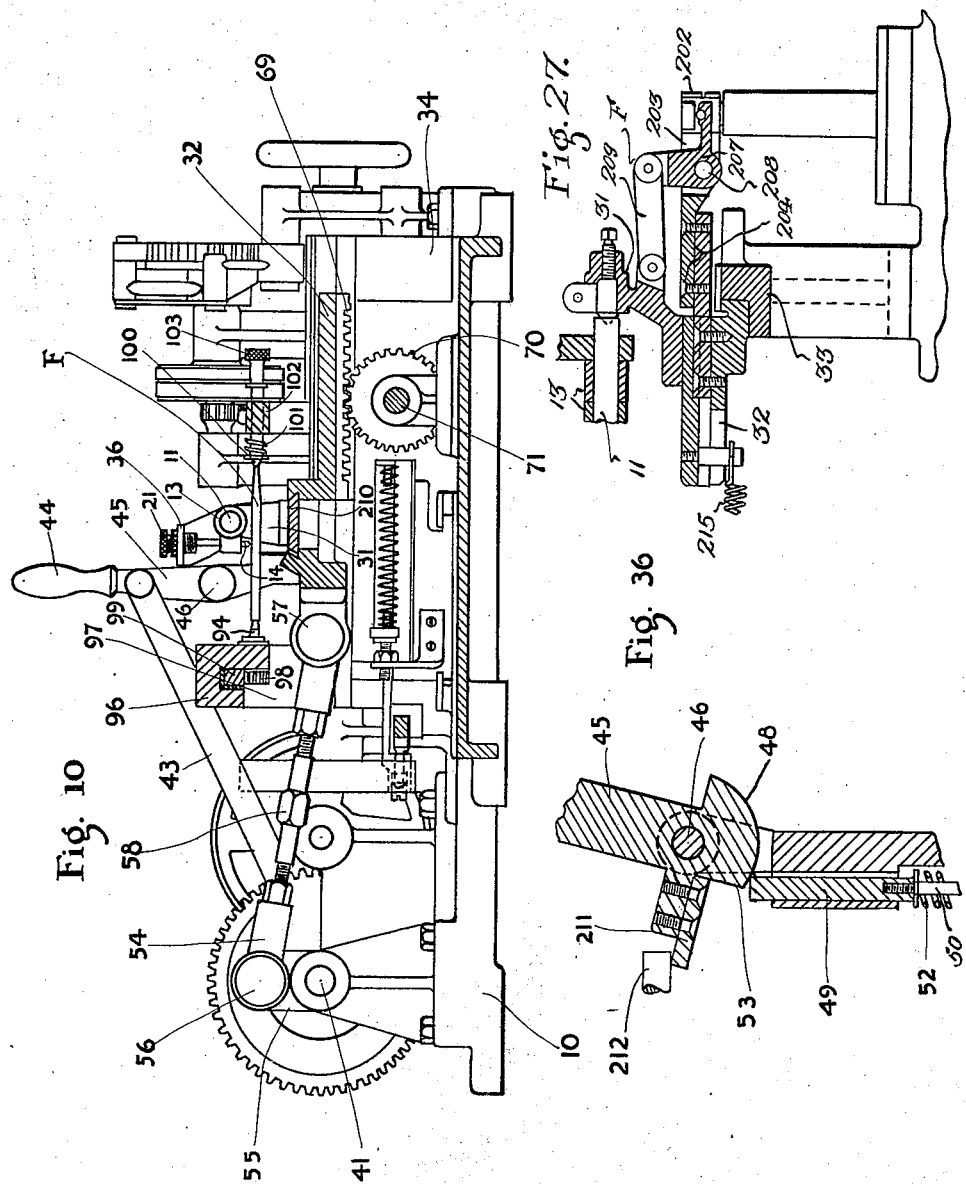

April 10, 1928.

F. J. KRISTOFEK ET AL 1,665,372

ENGINE TURNING MACHINE

Filed March 24, 1923

Inventors: Frank J. Kristofek
Walter F. Benson
by: 
Attorney

April 10, 1928.
F. J. KRISTOFEK ET AL
1,665,372
ENGINE TURNING MACHINE
Filed March 24, 1923     12 Sheets-Sheet 9
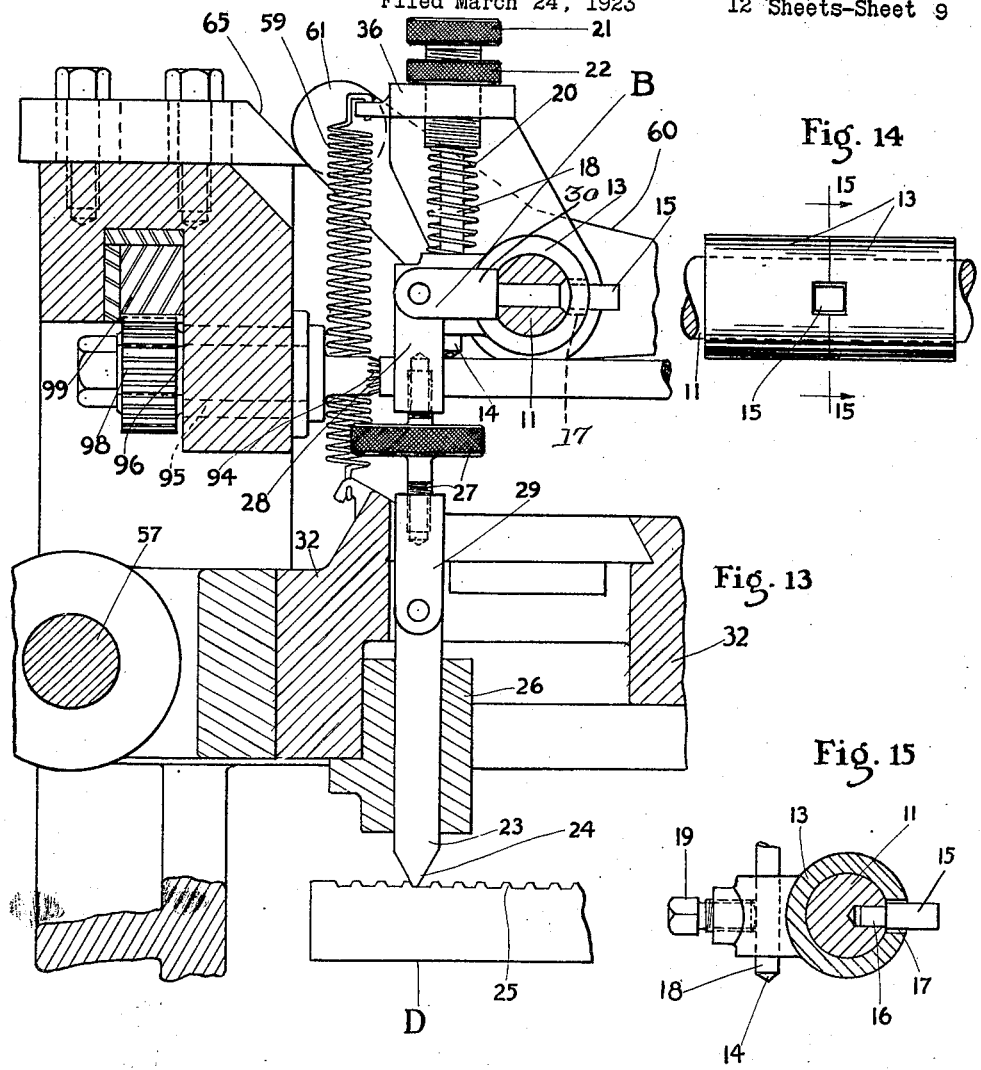
Inventors: Frank J. Kristofek
Walter F. Benson
by: *[signature]*
Attorney.

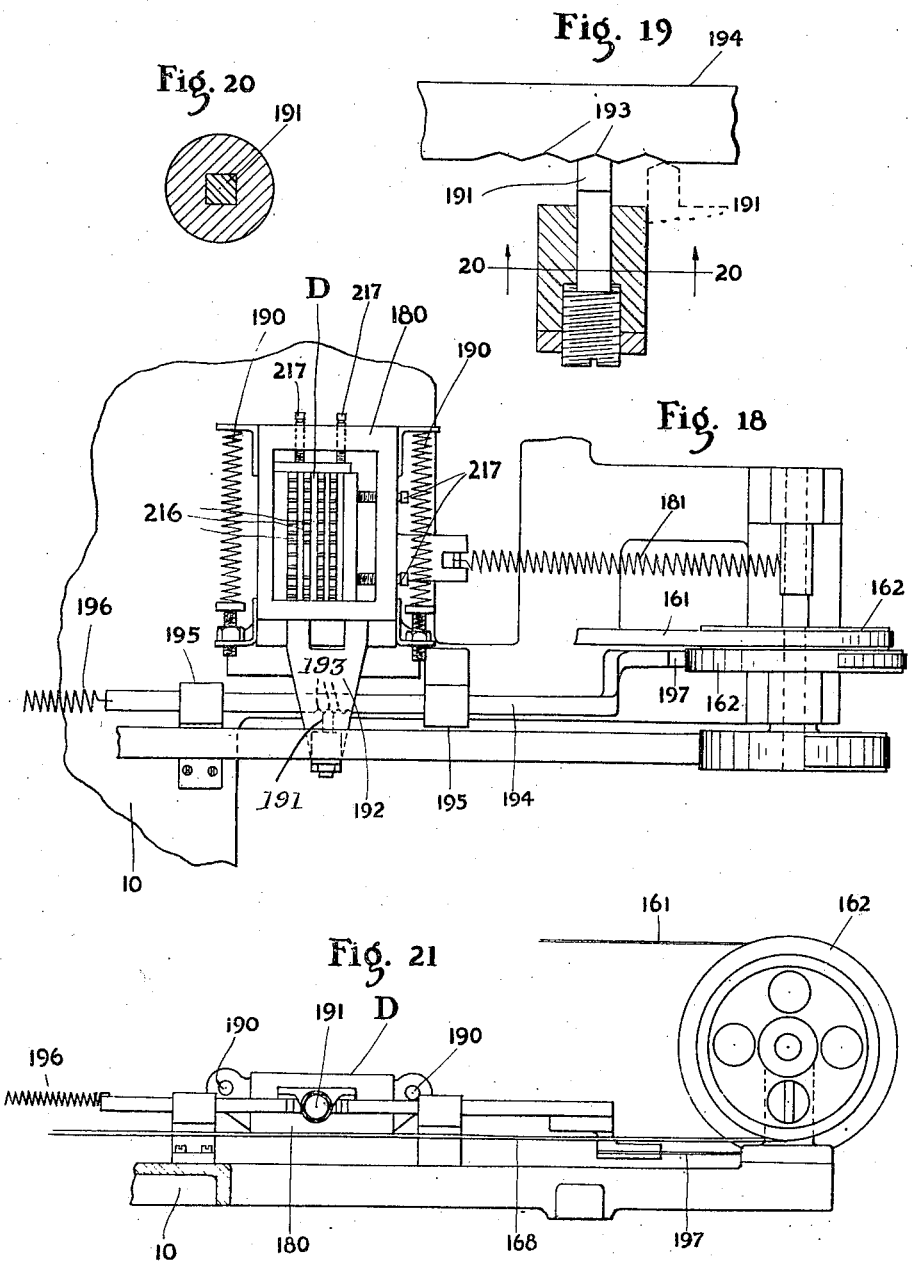

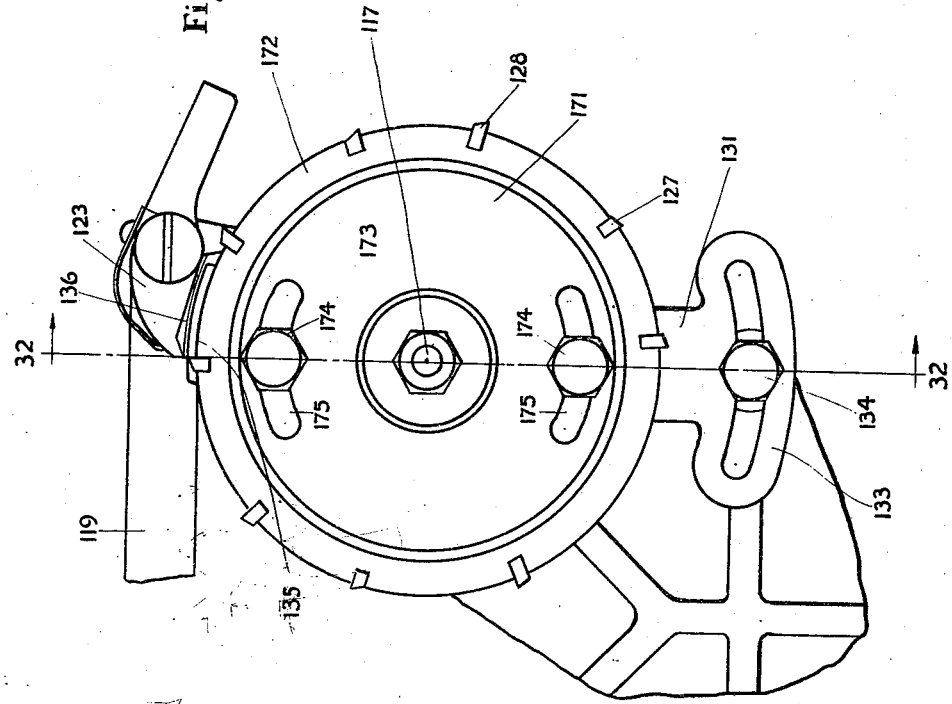
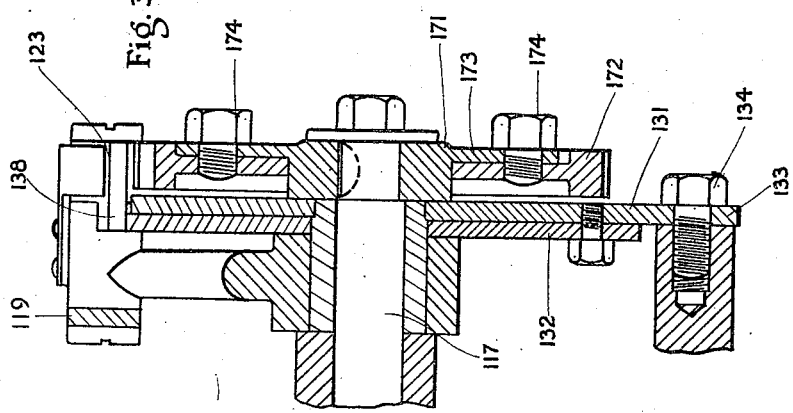

Patented Apr. 10, 1928.

1,665,372

UNITED STATES PATENT OFFICE.

FRANK J. KRISTOFEK AND WALTER F. BENSON, OF ST. PAUL, MINNESOTA, ASSIGNORS TO BROWN & BIGELOW, OF ST. PAUL, MINNESOTA, A CORPORATION OF MINNESOTA.

ENGINE-TURNING MACHINE.

Application filed March 24, 1923. Serial No. 627,337.

Our invention relates to engine turning machines designed to apply an ornamentation to cylindrical surfaces such as pencils and fountain pen barrels. Our machine is designed to operate automatically after the articles to be chased are set in position in the same.

A feature of the invention resides in means for holding a series of barrels which are engine turned simultaneously with the same design so that each and every barrel when finished is exactly the same with a fanciful design turned on the surface for ornamentation. When the machine is set in operation it continues to engrave the same design as is set up on the master plate to the surface of the barrels, continuing in operation until the complete design has been transferred or engraved on to the barrel surface without any attention of the operator, being automatic in each operation and coming to a stop automatically when the design is completed upon the pencil barrel.

The construction of our engine turning machine is of a simple nature and is so designed that the timing mechanism rotates the barrel or articles being engine turned by the stroke of the diamond points so as to permit a series of clear distinct individual marks to be formed in the article being engine turned, in accordance with the design carried by the master plate, so that when the design is completed upon the article being engine turned all of the marks will be uniform and clearly perceptible. The timing mechanism is arranged so that it can be adjusted for different articles which it may be desirable to engine turn in our machine adapting our engine turning machine to articles of different cylindrical measurements.

The structure of operation of travel of the diamond points is adjustable so that articles of different length can be engine turned to apply the desired ornamentation by simple and effective adjustment of means controlling the starting and releasing operation of the diamond points.

In a machine of this nature it is desirable to provide such mechanism as will operate continuously after being started to complete a design upon one or more articles at the same time and to permit any number of articles to be decorated or engine turned with the self-same design so that each and every article is practically identical in appearance when finished. Some engine turning machines have been made which are operated to engine turn the design upon the barrels or surfaces of the articles held therein, but in many of these machines it is necessary for the operator to closely and carefully observe the operation of the machine and to count the spacing of the marks each time and if the operator should make a mistake in counting the design an article would be spoiled, because it would not be uniform with the design desired and it would be readily apparent upon the article. In our engine turning machine all of the operations are automatic and an unskilled operator can, after becoming familiar with the starting of the machine, operate it in a manner to engine turn a large number of articles in a short time, all of which would have the self-same design with practically no perceivable difference in the designs engine turned upon the articles.

The invention includes an escapement mechanism which operates automatically so that designs can be engine turned upon articles with the marks clustered together and these clustered portions spaced apart in uniform relation about the article being engine turned in a manner to make a very attractive design or ornamentation upon the article by means of engine turning.

The features of the invention will be clearly set forth in the specification and claims to point out the arrangement of parts which function together to form our complete engine turning machine.

In the drawings forming a part of this specification:

Figure 2 is a front elevation of the same.

Figure 4 is an end elevation of our engine turning machine on the opposite end from that illustrated in Figure 3.

Figure 5 is a sectional elevation taken on line 5—5 of Figure 1.

Figure 6 is an enlarged detail of a portion of the timing mechanism.

Figure 7 is a plan view of that portion illustrated in Figure 6.

Figure 8 is a sectional view on line 8—8 of Figure 7.

Figure 9 is a back view of Figure 7 on the line 9—9.

Figure 10 is a section on the line 10—10 of Figure 1.

Figure 13 is an enlarged detail illustrating the adjustment of the operating engine turning diamonds.

Figure 14 is a detail of the shaft and bearings adapted to carry the diamonds of the machine.

Figure 15 is a section on the line 15—15 of Figure 14.

Figure 18 is a plan view of a portion of the machine illustrating a shifting mechanism for the master pattern plate.

Figure 19 is an enlarged detail of a portion of the mechanism in Figure 18.

Figure 20 is a section on the line 20—20 of Figure 19.

Figure 21 is a back elevation of that portion of the machine illustrated in Figure 18.

Figure 22 is a detail elevation of a portion of the controlling mechanism of the machine.

Figure 23 is a plan view of the parts illustrated in Figure 22.

Figure 24 is an enlarged plan view of a portion of the operating mechanism of the machine.

Figure 25 is a section on the line 25—25 of Figure 24.

Figure 26 is an enlarged detail of a portion of the shifting means for the diamond points on the line 26—26 of Figure 1.

Figure 27 is a section on the line 27—27 of Figure 26.

Figure 31 illustrates another form of the timing operating mechanism.

Figure 32 is a section along the line 32—32 of Figure 31.

Figure 33 is an enlarged detail of a portion of the operating mechanism.

Figure 34 is an enlarged section on the line 34—34 of Figure 11.

Figure 35 is an enlarged detail of the ribbon connection used on the engine turning machine.

Figure 36 is an enlarged sectional detail of the trip for the operating mechanism.

Figure 1:
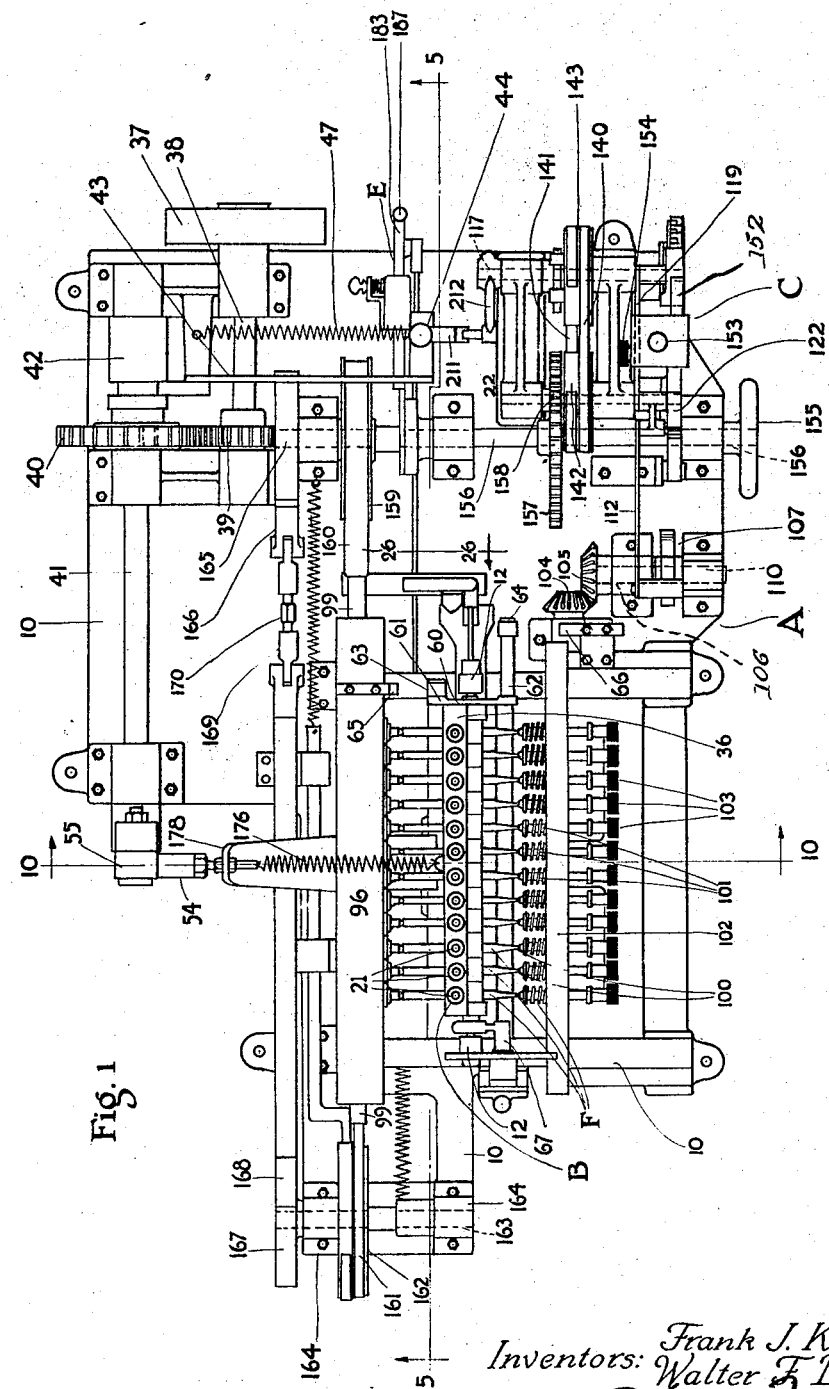
Figure 1 is a plan view of our engine turning machine.

In the drawings our engine turning machine A is illustrated designed particularly to engine turning pencil barrels or tubular articles so as to engrave a fanciful design upon the surface of the same.

Our engine turning machine A is entirely automatic after the articles are inserted in the same and the machine is started so that the operator after starting the machine does not need to count the operations as has usually been done in engine turning machines of this nature heretofore, but at the proper time when the engine turning is complete the machine automatically stops ready for operation and in position to receive a new series of articles after those which have been completed are removed.

The engine turning machine A is formed with means B for holding a series of diamond points for engraving or engine turning a series of articles simultaneously with the same design, which means is supported upon the bed or frame 10 in a manner so that it can be reciprocated back and forth to perform the functions required.

A suitable timing mechanism C is mounted upon the bed 10 of the machine A and is adapted to operate so as to rotate the articles being engine turned between the reciprocating movements of the engraving or engine turning means B.

The master pattern plate D in the engine turning machine A is provided with a releasing mechanism E which includes a suitable releasing cam to control the shifting of the design plate in the operation of the machine while engine turning in one direction.

In the machine A the engraving means B is made up of a horizontally extending shaft 11 which is supported on its ends in the bearings 12, free to be rotated within a limit of operation. The shaft 11 carries a series of supporting members 13 which hold the diamond points 14 in operating position. The supporting members 13 are freely journaled on the shaft 11 but are held so as to only move a limited distance in rotation by means of the keys 15 which are inserted in recesses 16 in the shaft 11. The keys 15 operate within recesses 17 formed in the adjacent edges of the members 13, as illustrated in Figure 14 and Figure 15. The recesses 17 formed in the members 13 are slightly greater than the size of the keys 15 so as to permit free movement of the members 13, which support the diamond points 14 so that when the diamond points 14 are brought into engagement with a pencil barrel F each diamond point 14 is free, within a certain limit of movement, to adjust itself to engage the surface of the pencil barrel in a manner to engrave the surface during the operation of the machine A.

The diamond points 14 are supported within the members 18 which are adjustably held by means of the screws 19 in the forward end of the members 13. The members 13 are placed adjacent each other along the shaft 11 so that one pin or key 15 can engage two of the members 13 to form a stop or limit of movement of the same.

The diamond points 14 are held in operating position under the tension of the springs 20 which bear against the members 13 and the tension of which is adjusted by means of the thumb screws 21 and held in position by the lock nuts 22.

The range of free movement of the members 13 is controlled at all times by the keys 15 which allow the members 13 to move in proportion to the spaces or recesses 17.

The operation of the diamond points 14 into engagement with the pencil barrels F is controlled by means of the master pattern plate D which is positoned on the bed 10 of the machine A and the diamonds 14 are raised away from the pencils F or brought into contact with the same by raising or lowering the diamonds which are controlled by the master plate engaging member 23 or tracing finger, which is formed with a tapered engaging point 24 that comes in direct contact with the formation or design 25 formed on the master plate D. The tracing finger 23 is journaled in the supporting member 26 which is connected by means of the adjusting screw 27 to the member 28 and the member 29. The member 29 is pivotally connected to the member 23 which constitutes the lifting pin and the member 28 is pivotally connected to the member 30 which member is keyed to the shaft 11. The adjusting screw 27 is interposed between the members 28 and 29 and is formed with right and left hand threads so as to provide the lengthening and shortening adjustment between the master pattern plate and diamond points 14.

Figure 11:
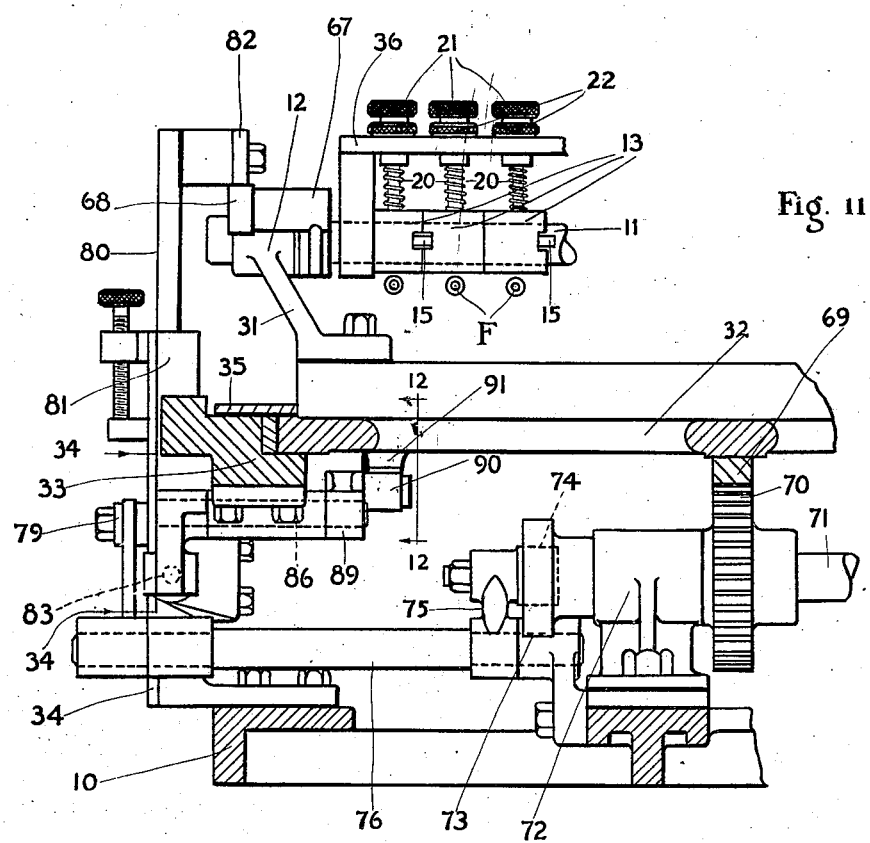
Figure 11 is an enlarged detail of a portion of the engine turning machine.

The journal bearings 12 which support the shaft 11 are carried by the member 31, (see Figure 11) above the carriage frame 32 and supported thereby in a suitable manner so that during the reciprocation of the carriage 32 the shaft 11, with its connected members, are carried in the same direction. The carriage 32 is adapted to reciprocate back and forth within the track 33, which is supported upon the bed plate 10 by suitable brackets 34. The plate members 35 hold the carriage 32 in place so as to permit free reciprocation of the same.

The adjusting nuts 21, together with the lock nuts 22, are supported by the horizontally extending frame member 36 which is supported on its ends by the shaft 11 so that the adjusting means for each of the diamond points is spaced above the same in a position where it is freely accessible for adjustment.

The machine A is driven by the drive pulley 37 which operates the shaft 38 to operate the gear 39 which meshes with the gear 40 carried freely on the shaft 41 which extends parallel to and just back of the shaft 38 and each of the shafts are held in suitable journals upon the bed 10 of the machine A. The gear 40 is connected with a clutch 42 of ordinary well known construction which, when tripped into operation, will operate the shaft 41. The clutch 42 can be thrown out to stop the operation of the machine A when it is desired, thus allowing the operating pulley 37 to continue to operate together with the connecting gears 39 and 40.

The clutch 42 is thrown into and out of operation by the link 43 which is provided with an operating handle 44 extending from the lever arm 45. The arm 45 is pivoted at 46. A suitable coil spring 47 tends to hold the lever 45 and operating link 43 in backward position. The lever 45 is provided with a cam operating surface 48, as illustrated in Figure 36, which engages with the releasing pin or catch 49. The catch 49 is operated by the rod 50 which is connected with the foot operating treadle 51 and is held into engagement with the cam 48 by the coil spring 52. When the operating lever 44 is moved into forward position the pin 49 will engage against the shoulder 53 adjacent one edge of the cam operating surface 48 to hold the handle 44 and lever 45 out of operating position.

The carriage 32 is reciprocated back and forth by means of the connecting link 54 which is connected on one end to the crank arm 55 at 56, the arm 55 being connected to the shaft 41 and operated thereby. The other end of the link 54 is pivotally connected to the carriage 32 at 57 and when the shaft 41 is rotated the link 54 will be operated by the crank arm 55 to reciprocate the carriage 32 back and forth. The arm 54 is provided with an adjusting nut 58 which is interposed between the ends of the same and forms an adjusting means for lengthening or shortening the arm 54. This means of adjustment permits changing of the position of the carriage 32 in its reciprocation as clearly illustrated in Figure 10 of the drawings. In the reciprocation of the carriage 32 the diamond points 14 are carried back and forth and in movement in one direction are held in engaging position with the pencil barrels F. The cross bar 36 which carries the adjusting means 21 for the diamond points 14 is held by the tension of the spring 59, one end of which engages the cross member 36 and the other end engages the carriage 32, as illustrated in Figure 13.

Thus in the operation of the carriage 32, together with the shaft 11 which moves the same, the cross member 36 is held with additional spring tension of the springs 59 which are positioned at either end of the cross member 36, to cause the diamond points to engage the pencil barrels when in operation. The shaft 11 is provided with a tilting lever 60 which is rigidly connected to the shaft in a suitable manner and is formed with projecting ends 61 and 62. The ends 61 and 62 carry rollers or anti-friction wheels 63 and 64, respectively, which engage with the adjustable cam surfaces 65 and 66 respectively, positioned and held in place at either end of the stroke or reciprocating movement of the carriage 32 on the frame of the machine A, illustrated in Figure 1.

When the carriage 32 is drawn into extreme backward position the anti-friction roller 63 engages the cam surface 65 and tilts the shaft 11 sufficiently to raise the diamond points 14 off of the pencils F, while when the carriage 32 is moved forward by the operation of the link 54 and the crank 55 and approaches the limit of movement in this direction, the antifriction wheel 64 engages the cam 66 and depresses the diamond points 14.

The cam 66 operates relatively the same as the cam 65, excepting that the cam 65 is on one end of the stroke of the carriage of the diamond points and the cam 66 is on the other end. When the roller 64 engages against the cam 66 it operates the lever 60 which causes the diamond point to follow the swaged end of the pencil barrel by raising the roller 64 on the opposite side of the pivot point to the roller 63. The diamond point will thus be depressed against the curvature or constricted end of the barrel.

When the carriage 32 reaches the limit of its forward movement the shaft 11 is tilted by the cam 66 to depress the diamonds 14 over the swaged end of the pencil barrel surfaces. The lever 60, of the shaft 11, carries an anti-friction roller 64 which is operated by the cam 66. The carriage 32 is provided with a rack 69 which engages with the gear 70 positioned beneath the carriage to operate the shaft 71 which carries the gear 70. The shaft 71 is supported in the journal bearing 72 which is secured to the frame 10 and carries the cam wheel 73, which engages the anti-friction roller 74 carried by the arm 75, which is rigidly secured to the shaft 76. The shaft 76 extends parallel to the shaft 71 and is secured in suitable journal bearings to the base frame 10. To the outer end of the shaft 76 is secured an operating lever 77 which is connected to one end of the link 78 (see Figures 4 and 11). The other end of the link 78 is connected at 79 to the vertically extending member 80 which is slidably held in the guide member 81 which is supported to the base frame 10 and extends upright thereon. The member 80 is formed with a horizontally extending member 82 which is adapted to come into contact with the anti-friction roller 68 on the operating lever 67, when at the moment that the carriage 32 reaches its limit of travel in a forward direction so as to tilt the shaft 11 to disengage diamonds 14 off the surface of the pencil barrels F. The member 82 is moved into downward position by the action of the cam 73 which operates the lever 75, shaft 76, arm 77 and pulls downward on the link 78 to lower the position of the member 82. The member 82 remains in this position on the back stroke or movement of the carriage 32 and until the lever 60 has come into position where the anti-friction roller engages the cam surface 65 to hold the diamond points off of the pencil barrels until the carriage 32 starts on its forward stroke. At this moment the member 82 is released which permits the diamond points to come into engagement with the surfaces of the pencil barrels.

The set screw 81' is carried by the guide 81 and is adapted to engage against the stop lug 80' carried by the member 80, which projects through a guiding slot in a manner to come in contact with the end of the screw 81', thus limiting the upward movement of the members 80 and 82.

When the carriage 32 reaches its forward limit of travel and the cam 73 is brought into engagement with the wheel 74 to operate the shaft 76 and draw the member 80 with its member 82 down into engagement with the wheel 68 to tilt the shaft 11 so as to draw the diamond points out of engagement with the barrels of the pencils, the catch 83 is forced into the recess 84 formed in the side of the member 80 to hold the members 80 and 82 in downward position. The catch 83 is supported on the side guide-way 81 and is operated automatically by the spring 85 to throw the catch into the recess 84. The operating shaft 86 is journaled beneath the track 33 and carries a lever 87 on one end which engages with the outer free end of the catch 83 at 88. The inner end of the shaft 86 carries the lever 89 which supports the anti-friction roller 90 on its free end. When the carriage 32 starts back on its forward movement the catch 83 is withdrawn from the recess 84 by the cam 91, which is secured to the lower surface of the carriage and which comes in contact with the wheel 90 to operate the lever 89 and rotate the shaft 86 in a direction to withdraw the catch 83 from the recess 84. When the catch 83 is withdrawn from the member 80 the coil spring 92 which is secured to the base 10 on one end and to the extension 93, formed on one end of the lever 75, draws or pushes the member 80 upward and releases the member 82 out of engagement with the tilting lever 67. At this moment the roller 63 of the tilting lever 60 is in engagement with the cam 65 and as soon as the carriage 32 moves slightly forward, the roller 63 disengages the cam 65 and drops the diamond points 14 into engagement with the barrels F.

At the moment that the diamond points are brought into engagement with the pencil barrels F, at the start of the forward movement of the carriage 32, the engagement of the diamond points 14 with the barrels F is controlled by the master pattern plate D through the lifting member 23 which follows over the pattern formed on the plate D so as to transfer the identical pattern from the plate D to the pencil barrels F in the course of the forward movement of the carriage 32. Thus whatever pattern is set up on the master pattern plate D will be readily and automatically transferred to the surface of the pencil barrels by the operation of the machine A.

The pencil barrels F are held firmly in place by engagement on their rear open end by the serrated plug members 94, which are formed on the ends of the shafts 95. The shafts 95 are supported in suitable cross members 96 which are held by the supports 97 to the supporting bed 10. Each of the shafts 95 are freely journaled in the cross members 96 and carry a pinion 98 on their outer end which meshes with the rack 99 which is held slidably within the cross member 96.

The other end or writing point of the pencils F is held by the engaging pins 100 which enter the small openings in the writing tips and are held into engagement with the tips by the coil springs 101. The pins 100 extend through and are supported by the cross members 102 which extend parallel to the members 96 and are supported from the base 10 by the brackets 34 which extend upward from either side of the carriage 32, and also support the same.

The pins 100 are formed with outer engaging ends 103 which permit the same to be readily engaged to draw them against the springs 101 so that in placing the pencil barrels F in the machine A the open end of the pencil is brought into engagement with the plugs 94 and then the pin 100 is released into engagement with the writing tip or apex of the pencil. This means of engagement supports the pencils F adjacent each other and at the same general parallel relation as the tension of the coil springs 101 so as to hold them firmly in the machine A.

The timing mechanism C is adapted to operate to rotate the pencil barrels F at the proper time and the selected degree of rotation so that the diamond points will engage a different longitudinal area each stroke of engagement on the surfaces of the pencil barrels. The timing mechanism is operated by the shaft 71 which extends to one side of the carriage 32 and supports the beveled gear 104 which meshes with the gear 105 on the transversally extending shaft 106. The shaft 106 is supported by brackets to the bed 10 and carries a gear 107 which meshes with the segmental gear 108 formed on one end of the rocker arm 109, which is pivotally supported at 110 above the shaft 106. The other end of the rocker arm 109 is connected at 111 to the operating link or connecting rod 112 which is connected at 113 to the rocker member 114 which is pivotally supported upon the shaft 115. The shaft 115 is a short jack shaft which is supported by the bracket 116 on the base 10 of the machine A and this bracket also supports another jack shaft 117 which is positioned adjacent and parallel to the shaft 115 and at the same relative height from the base or bed 10 of the machine A. The rocker member 114 is connected at 118 by a connecting link 119 to the rocker member 120 which is carried by the shaft 117 in a similar manner that the rocker member 114 is carried by the shaft 115. The link 119 connects with the rocker member 120 at 121 and the rocker member 114 supports an operating dog 122 which is axially positioned with the connection 118 while the rocker member 120 carries an operating dog 123 which is axially positioned with the connection 121 of the connecting link 119.

The pivot member is connected in back of the dog 122 by a link not shown through the arm 114. This does not appear from the front view as illustrated in Figure 2.

The shaft 115 supports a tooth wheel 124, the teeth 125 of which represent individual lines engraved or engine turned upon the barrels F by the diamond points 14. The operating dog 122 is held above the teeth 125 so as to engage the same during the operation of the machine.

The shaft 117 supports a tooth wheel 126 which is provided with adjustable teeth 127 and 128. These teeth are adapted to be engaged by the dog 123. When the operating link 112 is reciprocated the connecting link 119 operates the rocker members 114 and 120 which operate the dogs 122 and 123 back and forth over the teeth of the tooth wheels 124 and 126 respectively.

The teeth 127 and 128 of the wheel 126 represent the blank spaces between the lines engraved by the diamond points 14, as are represented by the teeth 125. These teeth 127 and 128 are adjustably held upon the wheel 126 by means of the annular slot 129 and the lock nuts 130 which hold the segments forming the teeth and their supporting part of the wheel 126 in the desired position. The teeth 127 are smaller in height than the teeth 128 so that the operating dog 123 can pass over the teeth 127 when it is desired and yet engage with the teeth 128. The different heights of these teeth represent different spaces between the lines to be engraved on the pencil barrels.

A pair of cam members 131 and 132 are adjustably held upon the shaft 117 by means of the segment 133 exending below the wheel 126 and formed with a slot through which the lock nut 134 extends to hold the cam 131 in the desired position. The cam 131 is formed with its projecting surface 135 extending beyond the periphery of the toothed wheel 126 sufficiently so as to clear the engaging point of the teeth 127 while the cam surface 136 of the cam 132 extends beyond the engaging periphery of the teeth 128 so as to hold the operating end of the pawl or dog 123 out of engagement with the teeth 128 in the back stroke of the pawl and when set to engage the teeth 127. A set screw 137 is adapted to set the cams 131 and 132 in relation to each other, as is illustrated in Figure 8, so that the projecting portion 138 formed on the pawl 123, as illustrated in Figure 7, will engage with the surfaces 135 and 136 throughout a portion of the movement of the pawl 123, so that the pawl 123 is held out of engagement with either one of the sets of teeth, 127 and 128 for that portion of the stroke or movement of the dog 123 in the operation of the machine A. The adjustment of the teeth on the wheel 126 permits them to be set so as to be engaged at the desired moment. The tooth wheel 124 and the pawl 122 are provided with a cam member similar to the cam 131 with the same adjustment and having the cam surface 139 which is positioned so as to engage the pawl 122 to hold it off of the teeth 125 in a similar manner as the pawl 123 is held off of the teeth of the wheel 126, excepting the wheel 124 has only one cam surface associated with the operating pawl.

The toothed wheels 124 and 126 are operated in unison at all times so that the wheel 124 takes care of the individual lines to be engraved or engine turned on the pencil barrels, while the wheel 126 takes care of the blank space between the lines of the pattern being engine turned on the pencils. To facilitate the operation of the wheels 124 and 126 together without any lost motion, we provide a pair of connecting metal belts 140 and 141 which have their ends secured to the wheels 142 and 143 fast on the shafts 115 and 117 respectively. The belts 140 and 141 are arranged so that the belt 140 normally extends over the top of the wheels 142 and 143 and the belt 141 extends over the bottom of the wheels respectively. This construction provides means to eliminate all possible lost motion and connects the shafts 115 and 117 to operate in unison. The wheels 142 and 143 are formed with sufficient width on their belt engaging surface to permit the belts 140 and 141 to be positioned adjacent and in parallel relation to each other. The wheel 143 is divided into two parts 144 and 145. The part 144 carries one end of the belt 140, while the part 145 carries the end of the belt 141 and the part 144 is keyed, in the ordinary manner, to the shaft 117, while the part 145 is freely rotatable thereon. The members 144 and 145 of the wheel 143 are connected together by the adjusting screw 146, which engages the lug 147 formed on the part 145 and the lug 148 extends through the slot 149 in the part 145 and is secured to the part 144. The locking screw 150 which operates in the slot 151 locks the two members 144 and 145 together. This adjustment permits the slack to be taken out of the belts 140 and 141 and to draw them tight enough to insure no perceivable amount of lost motion by the shafts 115 and 117.

Each of the pawls, 122 and 123, are provided with an extension which is adapted to be engaged by the ends of the cross member 152, which is adjustably held in the connecting link 119. The cross member 152 is operated by the handle 153 and is held in set position in the link 119 by the set screw 154. When it is desired to set the timing mechanism into starting position, after it has completed its movement, to time the rotation of the pencil barrels to a complete revolution the engaging member 152 is released and its ends brought into engagement with the projecting pawls 122 and 123 to release them out of operating position and engagement with the wheels 124 and 126. When the pawls 122 and 123 are held released by engaging the operating handle 155, which is secured to the shaft 156, it is engaged and rotated in a direction so as to bring the timing wheels 124 and 126 back to starting position. The shaft 156 extends backward along the bed plate 10 and is supported in suitable journals so as to position it to one side and beneath the shaft 115, and it is connected with the shaft 115 by means of the gear 157 which is mounted on the shaft 156 and the pinion 158, which is mounted upon the shaft 115 so that when the handle 155 is turned then the shaft 115 is also rotated and the shaft 117 operates in unison therewith by virtue of the connecting belts 140 and 141.

Near the rear end of the shaft 156 a belt wheel 159 is secured to the shaft and this wheel carries the metal belt 160 which connects to one end of the rack 99. The other end of the rack 99 is engaged by the metal belt 161 which is secured to the wheel 162, which is keyed on the jack shaft 163 on the other side of the rack 99, as illustrated in Figure 1 of the drawings. The shaft 163 is supported in the bearings 164 which are secured to the projecting portion of the base or bed 10 of the machine A. The shaft 156 has keyed thereto another belt wheel 165 back of the wheel 159 to which is secured the metal belt 166, while the shaft 163 has keyed thereto a belt wheel 167 which carries the metal belt 168. The belts 166 and 168 are connected by the link 169 which is provided with an adjusting nut 170, having the right and left hand thread so as to take up the slack in the belts 160, 161, 166 and 168. The belts connected to the rack bar 99, namely, 160 and 161 extend over the top of the wheels 159 and 162, while the belt members 166 and 168 are positioned diametrically opposite on the wheels 165 and 167 so that when the nut 170 is adjusted the slack between the belts and connecting parts is taken up to the extent so that there will be practically little or no lost motion in the rotation of the shafts 156 and 163.

During the operation of the timing mechanism C by the shaft 71 through the operating lever 112 the shafts 115 and 117 are rotated and the shaft 156 is rotated through the pinion 158 and the gear 157. As the shaft 156 is rotated the rack bar 99 will be operated in the direction of rotation of the shaft and thereby rotate the pinions 98 together with the engaging plugs 94 which will rotate the pencils F. In this manner the timing mechanism C operates to rotate the shaft 156 and through the belts 160, 161, 166 and 168, together with the connected parts and the rack 99 rotate the pencil barrels F the desired degree between each forward movement of the carriage 32 and the diamond points 14.

Figure 28:
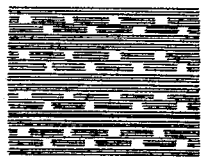
Figure 28 illustrates a pattern developed in a plane of a design engine turned by our machine.
Figure 3:
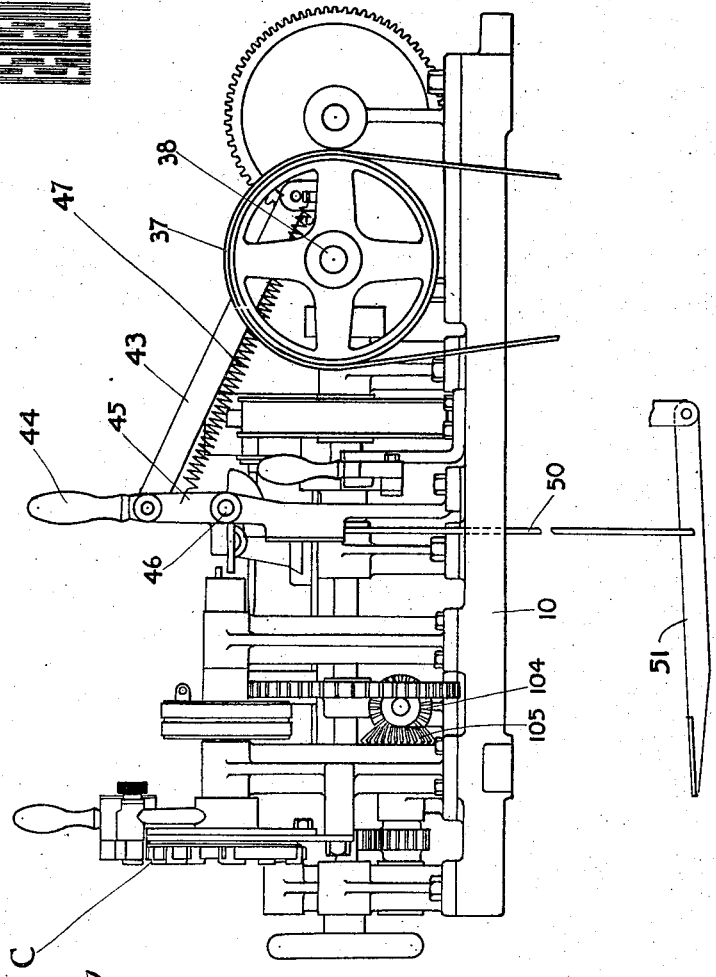
Figure 3 is an end elevation of the same, slightly enlarged to illustrate the parts.
Figure 29:
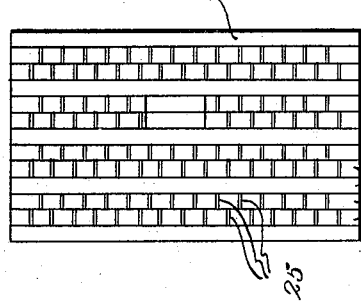
Figure 29 is a plan view of the master pattern plate segments used to make the design in Figure 28.
Figure 30:
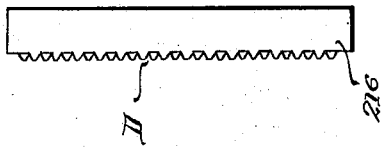
Figure 30 is a side elevation of Figure 29.
Figure 12:
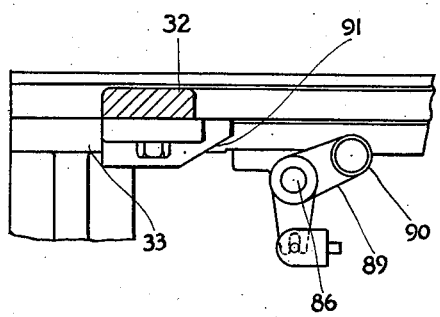
Figure 12 is an enlarged detail on the line 12—12 of Figure 11.

The movement of the pencil barrels is timed so as to take place at the time when the carriage 32 is at its backward position, just before the carriage moves forward and the diamonds 14 are released into engagement with the pencil barrels. The movement of the barrels is governed by the timing means C. The wheel 124 moves the barrels the space of a line at a time and the wheel 126 is adapted to move the barrel any space from which it is set which is more than a single line. This construction permits a pattern to be engine turned upon the surface of the pencil barrels, as is illustrated in Figure 28, with the lines clustered together and spaced longitudinally apart. By the variation of the master pattern plate different designs can be readily engine turned upon the pencil barrels F.

In Figures 31 and 32 we have illustrated a variation of the construction of the wheel 126 by the wheel 171, which is keyed to the shaft 117 in the same manner as the wheel 126. In this construction the wheel 171 is made in two parts, namely 172 and 173, which are secured together by the adjusting bolts 174. The member 173 constitutes the portion of the wheel 171 which is keyed to the shaft 117, while the member 172 carries the locking bolts 174 and by means of the slots 175 the two members 172 and 173 can be adjusted in relation to each other so as to set the teeth 127 and 128, which perform the same functions as those of the wheel 126, in proper relation so as to form the desired blank space on the pencil barrels in the operation of the diamonds. In this construction the teeth 127 and 128 are set rigidly in the rim of the member 172 and are not slidably held, as is illustrated in the construction of the wheel 126. The adjustment of the teeth held in this construction is accomplished through the bolts 174 and the two members 172 and 173.

Figure 16:
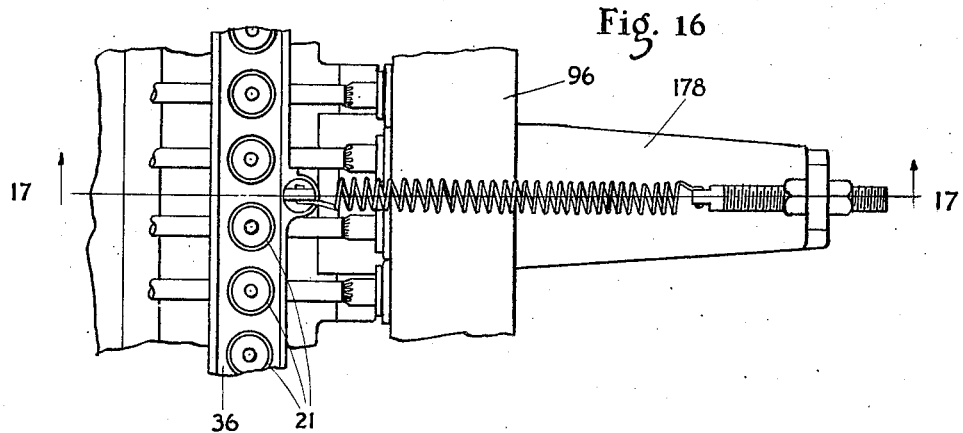
Figure 16 is a plan view of a portion of the machine.
Figure 17:
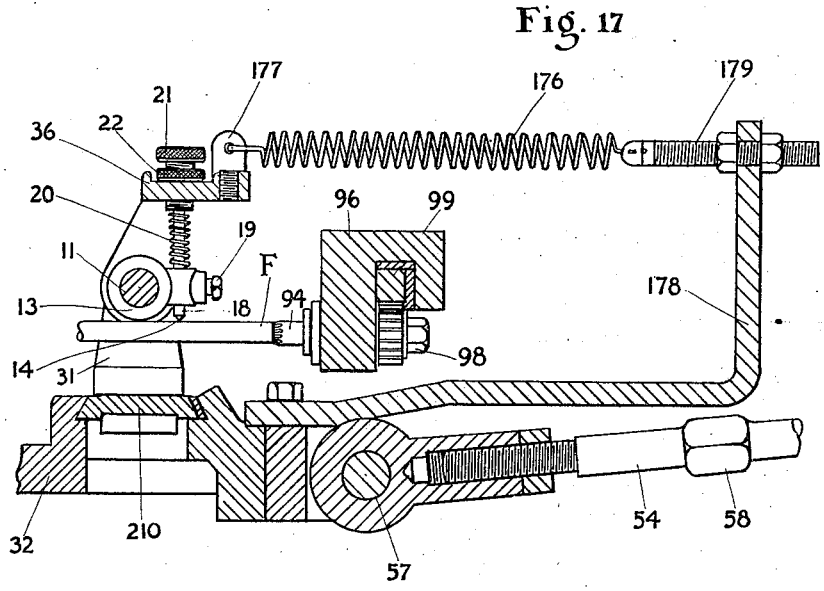
Figure 17 is a section on the line 17—17 of Figure 16.

The cross member 36 which carries the adjusting screws for the diamonds 14, as illustrated in Figures 16 and 17, and the shaft 11 with the members 13 are held in addition to the springs 59 which are illustrated in Figure 13, by the spring 176 which engages the lug 177 on the member 36 and the other end is supported by the bracket 178 which extends from and is secured to the carriage 32. A suitable adjusting means 179 is provided for the spring 176 so as to arrange for the proper tension of the spring.

In Figure 35 the connection of the ends of the metal belt 161 and 160 to the rack bar 99 is illustrated.

The master pattern plate D is held slidable upon the bed plate 10 of the machine A so that it can be shifted transversally and longitudinally in relation to the pencil barrels F or other articles held in the machine A. In the drawing in Figure 5 we have illustrated a means for shifting the pattern plate D transverse of the pencil barrels F. In this construction the supporting frame 180 for the master pattern plate D is slidably secured on the base 10 and is drawn in one direction by the coil spring 181. The other side of the supporting frame 180 is connected by means of the rod 182 with a cam engaging bar 183, the end of which engages the notches 184 in the cam 185.

The cam 185 is adjustably secured to the collar 186 which is keyed to the shaft 156 so as to operate therewith during the operation of the machine A.

In the operation of the machine A the end 24 of the pin 23 rides over the master plate D. The raised portions on the master plate D cause the pin 23 to raise the diamond points 14 off of the surface of the pencil barrels F and thus form a broken longitudinal line along the pencil barrel.

It is desirable to have the end 24 of the pin 23 engage the surface of the plate D where protrusions such as 25 are formed with as broad a bearing as possible throughout the formation of the broken pattern on the barrels F. This is accomplished by allowing the end 24 of the pin 23 to remain central along the surfaces 25 of the master plate. The cam 185 is gradually turned each time a line is engraved on the pencil barrel so that the engagement of the bar 183 with the notches 184 of the cam 185 gradually becomes less and less while the pin 24 stays in the same relative position until the cam 185 is moved into a position to release the cam engaging end of the bar 183 into a different notch 184 at which time the master plate D is shifted in a position so as to cause the end of the pin 23 to engage in a different surface in the master plate. This action is timed so as to take place when the carriage 32 is at the position where the barrels are shifted or rotated as hereinbefore described and is accomplished automatically and momentarily so that before the carriage 32 moves so that the pin 23 engages the master plate, the master plate has shifted to the new position by the action of the cam 185 and the spring 181 and the desired design is transferred onto the barrels F. This construction minimizes the wear on the pin 23 and gives a positive automatic action which accomplishes the desired results.

When the machine A is operated so that the entire pattern from the master plate D has been transferred to the barrels F, it is necessary to reset the master plate into starting position. This is accomplished by engaging the handle 187 and drawing the bar 183 over until the spring catch 188 engages in the notch 189 formed in the bar 183 and clearly illustrated in Figures 24 and 25. The spring catch 188 holds the cam engaging end of the bar 183 out of engagement and clear of the cam 185 so that when the timing mechanism is reset as hereinbefore described and the shaft 156 is rotated in its backward direction the cam 185 is set into starting position after which the catch 188 is released which allows the cam engaging end of the bar 183 to come in contact, at the starting point, with the cam 185.

In making certain patterns it is desirable to move the master plate D in a longitudinal direction in relation to the articles F held in the machine A each time a line is made by the diamond points 14. This is accomplished by our shifting mechanism which is illustrated in Figures 18 to 21 of the drawings. In this construction the master plate D is held by the compression springs 190 with the locating pin 191, which is supported to the frame 180 of the master plate by the bracket 192 in engagement under the spring tension of the spring 190 with the surface of the notches or formations 193 in the bar 194. The bar 194 is slidably held by the supports 195 in the bed 10 of the machine A and one end is engaged by a coil spring 196, while the other end is secured to the metal belt 197 which is secured to a portion of the wheel 162. During the operation of the machine A as the pencil barrels F are rotated each time a line is engine turned thereon, the wheel 162 moves a sufficient distance to turn the pencil barrels by means of the rack 99 and at the same time the bar 194 is shifted, causing the master plate D to move a relative and proportionate amount longitudinally in relation to the barrels or articles F and thus the pattern transferred from the master plate to the barrels is varied as may be desired. The formations 193 in the bar 194 regulate the extent of the movement of the master plate D.

The pin 191 moves gradually from one notch to the other in the course of operation of the engraving diamond, and as the movement is very slight between each line engraved on the pencil it is evident that the pin 191 moves slowly up the side of the notches 193. This is clearly apparent from the enlarged detail of these parts in Figure 19. This shifts the lines of the pattern so as to give a V shaped configuration or outline to the same, but it must be borne in mind that the shifting of the bar 194 is very slight so that the pin 191 is forced gradually to the highest point of the notches 193 and then down the other side to the lowest point.

In the operation of the machine A in making certain patterns on articles F held therein, it is sometimes desired to cause the shaft 11 which carries the diamond supporting member 13 to be vibrated to form a wave line during the extent of movement of the carriage 32. This is accomplished in our machine by means of the mechanism illustrated in Figures 26 and 27. Figure 26 is a view approximately on the line 26—26 of Figure 1 and illustrates the serrated bar 198 which is supported by the brackets 199 to the bed plate 10 of the machine A. The bar 198 is engaged by the finger pin 200 which is carried by the arm 201. The arm 201 is pivotally connected at 202 by the supporting bracket 203 which is secured at 204 to the carriage 32 of the machine A. The arm 201 is formed with a lug 205 which extends into engagement with the ball 206 which is carried by a crank arm 207 pivotally connected at 208 to the bracket 203. A link 209 connects the crank arm 207 with the supporting brackets 31 which hold the journal bearings 12 for the shaft 11. When the carriage 32 is moved forward the finger 200 rides over the serrations 198 and causes the lever 201 to operate the crank arm 207 so that the link 209 will operate to cause the shaft 11 to be vibrated transversally in relation to the articles F so that the diamond points will form a wave line on the barrels or articles F. The supports 31 are held by the transversally extending bar 210 which is slidably secured transversally in the carriage 32, as illustrated in Figures 10, 13, and 17. The member 210 is dovetailed into the frame of the bed or carriage 32 and is free to slide transversally when the wave line mechanism G is operated. The carriage 32 is held by the spring 215, as illustrated in Figure 27, to cause the finger pin 200 to engage the serrations 198 at all times. The spring 215 operates the carriage in one direction while the finger pin 200 passing over the serrations 198 moves the carriage 32 in the other direction.

The operation of the machine A is entirely automatic after it is started and the clutch 42 is thrown into action by means of the starting handle 44 or the foot treadle 51. The lever 45 is formed with a projecting portion 211 which is adapted to be engaged by the lever arm 212, which is secured or rigidly connected to the shaft 117 of the timing mechanism C. When the timing mechanism has operated the machine and completed the spacing of the pattern upon the articles F the lever 212 automatically engages the portion 211 projecting from the lever 45 and trips the same to operate the lever 43 and release the clutch 42 so that the machine A stops automatically. This construction provides a simple and effective means which automatically stops the machine A at the time the carriage 32 is in position to begin a new operation or stroke.

In order that the timing mechanism may operate most effectively without any question as to the accuracy of the spacing we provide a pawl 213 which is held into operating position by the spring 214 with the teeth 125 of the wheel 124 so as to hold the timing mechanism against any back lash of the gears and connecting parts. This pawl 213 acts also to indicate the correct movement of the timing mechanism during each operation, because it is apparent that at the end of the operating stroke of the pawls 122 and 123 that the pawl 213 should come into engagement with one of the teeth 125 of the wheel 124. When the timing mechanism is reset the pawl 213 is raised and held by the curved end of the spring 214 out of engagement with the teeth 125. This is of ordinary construction and is not illustrated in released position in the drawings.

When the articles which are engine turned by the machine A are finished with a pattern engraved on their surface the machine A automatically stops and the operator removes these articles and inserts a new series. The timing mechanism is then reset, releasing the dogs 122 and 123 out of engagement with the wheels 124 and 126 and turning the handle 155 in a backward direction so as to reset the timing wheels, but before the timing mechanism is reset the cam engaging arm or bar 183 is drawn out of engagement with the cam 185 so that the cam can be rotated back to starting position. Just before the machine is started the operator releases the catch 188, permitting the bar 183 to engage the cam 185 and by tripping the lever 45 into operating position the clutch 42 causes the shaft 41 to operate and the machine A begins to function in all its detail so as to transfer the desired pattern on to the pencil barrels or articles F.

The master plate D is made up of a series of segments 216 which are clamped together by means of the set screw 217 in the master plate frame. This construction permits the master plate to be changed so that different sized pencils can be readily engraved or engine turned without making it necessary to change the complete master plate, only such portions being removed as are necessary. The master plate naturally is made of steel so that it will not readily wear from the tracer finger 23 passing over the same and it is a material advantage to have it made up of segments which can be replaced or changed as may be desired. The segments 216 can be made in different lengths so that one or more of these segments will complete the desired length with the pattern to be engine turned upon the pencil barrels.

After the machine A starts each operation is automatic and no attention is required of the operator so that by suitable arrangement by a bell or other means not illustrated in the drawings, the operator can be directed when the machine has finished its operation of engine turning the articles placed in the same. This permits the operator to take care of more than one of these machines at one time and without concern as to the work which is turned out on the engine turning machine after it is once set to transfer a particular pattern. The adjustments on the machine A, together with the mechanism for operating the master pattern plate, permit a large range of patterns to be made by our machine and it is an important feature of the invention that each of the operations of the machine are automatic including the stopping of the same after the work has been completed of transferring the design upon the articles held in the same.

In accordance with the patent statutes we have described the principles of operation of our invention, together with the apparatus which we desire to illustrate. The drawings are only illustrative and we desire to have it understood that the invention can be carried out by other means and applied to uses other than those above set forth within the scope of the following claims.

We claim—

1. An engine turning machine for engine turning an article held therein, including automatically operated means for engine turning a design, a flat master pattern plate which moves in a single plane positioned below the article and an automatic stop means for said machine.

2. An automatic engine turning machine adapted to mechanically engine turn a series of articles simultaneously, a single pattern movable in a plane beneath the articles and means for operating said machine.

3. An engine turning machine including, a flat master pattern plate movable transversely and longitudinally in a single plane below articles being engine turned, and automatic stopping means.

4. In a device of the class described including, means for holding an article, means for engine turning a design on the supported article with straight longitudinal lines, either continuous or broken through the major part of the length of the article supported, a master pattern plate extending in a plane beneath the articles and means for automatically spacing and stopping the operations of said device.

5. In a device of the class described comprising, means for supporting articles to be engine turned, means for engine turning straight line designs upon the articles, a master pattern plate and means for varying the starting points of the straight line design turned on the articles supported in said device by shifting said pattern plate in a plane longitudinally.

6. An engine turning machine for automatically engine turning a pattern on an article held therein with straight longitudinally extending lines, wave lines and with lines having a varying starting point to engine turn various patterns on an article held in said machine including a flat master pattern plate and means for shifting said plate in a single plane.

7. An engine turning machine including, means for automatically engine turning an article held in said machine either with a straight line pattern, wave line pattern or a pattern wherein each line has a different starting point, said means comprising a master pattern plate shiftable longitudinally and transversely.

8. An engine turning machine including, a single flat master pattern plate, a timing means, a supporting means for articles to be engine turned, means for shifting said plate in different directions and means for automatically controlling each operation of said machine.

9. An engine turning machine comprising, means for holding a master pattern plate movable in a plane, an engine turning carriage, means for supporting an article to be engine turned in operative relation to said carriage, a timing means adapted to control the movement of the article to be engine turned, means for automatically moving the master pattern plate holding means, means for operating said carriage and means for automatically stopping the operation of said machine.

10. An engine turning device, means for holding an article in said device to be engine turned, means for holding flat pattern for a design, means for operating the design pattern in different directions simultaneously and automatically, to engine turn a design in accordance with the pattern held in said device and in accordance to the movement of the pattern.

11. An engine turning device having a pattern holding means and means for automatically simultaneously shifting said pattern in various directions on a single plane to engine turn a fanciful design in accordance with the pattern and the shifting thereof.

12. An engine turning device including, means for automatically engine turning straight longitudinal lines, wave lines, and shaded lines to make a fanciful design upon an article held in said engine turning device by a flat master pattern plate movable simultaneously transversely and longitudinally in a plane.

13. An engine engraving apparatus consisting of means for adjustably supporting an engine turning diamond, means for automatically moving said diamond supporting means in various directions simultaneously to engine turn various fanciful designs on an article held therein and a flat master pattern movable in a single plane below said diamond controlling the design engraved by said diamond.

14. Engine turning apparatus comprising, a series of engine turning diamond points, means for supporting said diamonds in a manner to be self-adjustable in relation to each other, means for supporting a series of articles adjacent said diamonds and means for automatically operating said diamonds and the articles supported in a manner to cause said diamonds to engine turn a fanciful pattern upon the articles.

15. An engine turning machine including, diamond point holding means, means for reciprocating said holding means back and forth, means for holding an article to be engine turned beneath said diamond holding means, release means for raising and lowering said diamond holding means out of operating position at the end of travel in either direction, means for holding said diamond holding means out of operating position in its travel in one direction and means for simultaneously moving said diamond holding means in different directions.

16. An engine turning device including, a diamond point, resilient means for holding said diamond point in operating position and means for adjusting the tension on said resilient means and diamond points to increase or descrease the activity of engagement of said diamond point in the operation of said engine turning machine.

17. A diamond point holding means for an engine turning machine including, a member having a diamond fixed in one end thereof and means for adjustably holding said diamond holding member as to its vertical position and horizontal position in the engine turning machine.

18. An engine turning machine including, a diamond supporting means adapted to hold the diamond point in a manner to be self-adjusting to the contour of an article being engine turned in said machine.

19. An engine turning machine, a diamond supporting member, a flat master pattern plate movable longitudinally and transversely in a single plane and means for adjustably possitioning a diamond point in relation to the master pattern plate.

20. A diamond support for engine turning, a rod member having a diamond fixed at the end thereof, a member for supporting said rod member, a shaft for journalling said supporting member, a stop fixed in said shaft and a recess formed in said supporting member to permit said supporting member to move freely a limited amount on said shaft by the engagement of the stop in the recess of said supporting member.

21. Diamond point supporting means for an engine turning machine including, a shaft, journal supports for said shaft, means for rocking said shaft in said journals, a member journaled on said shaft, a stop fixed in said shaft to limit the movement of said member on said shaft and means for adjustably holding a diamond point holding member in said member journaled on said shaft.

22. An engine turning machine including, a series of diamond points, means for supporting said diamond points movable upon the same axis, means for reciprocating said diamond point supporting means and adjustable cam means for moving the diamond point supporting means into and out of operating position by movement on the common axis for supporting said diamonds.

23. An engine turning machine including, a series of diamond engraving points and means for supporting said diamond points on a common axis in a manner to permit independent movement of each diamond in relation to each other so that it may adjust its operating position in accordance with the contour of the article being engine turned.

24. An engine turning device including, a nat master pattern plate and means for automatically moving said plate a step at a time during the operation of said machine, each step movement of said plate representing a cluster of engraved lines and the master plate is held in a single collective unit.

25. An engine turning device including a single unit master pattern plate designed to be engine turned onto articles held in said device, a pattern tracing finger adapted to be moved over said pattern plate and means for automatically moving in a single plane said pattern plate transverse of the movement of said tracing finger at timed intervals.

26. An engine turning machine, a flat master pattern plate movable longitudinally and transversely in a single plane in said machine and a cam adapted to regulate the movement of said master pattern plate.

27. An engine turning machine including a master pattern plate, a cam for regulating the movement of said pattern plate, a cam engaging member connected with said pattern plate and means for holding said cam engaging member out of engagement with said cam to permit resetting of said cam in the operation of said machine.

28. A flat master pattern plate for an engine turning machine, a pattern plate operating cam and resilient means for holding said pattern plate connected with said cam to cause said pattern plate to be moved in a single plane automatically in the operation of the engine turning machine.

29. An engine turning machine including diamond engraving points, a master pattern plate to control the engraving movement of said points, a pattern plate operating cam having a series of notches and means for holding said pattern plate connected with said cam whereby said pattern plate will be moved a step at a time automatically in the operation of said engine turning machine.

30. An engine turning machine including a series of diamond engraving points, means for operating said points in a direction to engrave straight and curved lines simultaneously, a flat master pattern plate adapted to direct the operating movement of said points and means for moving said master pattern plate longitudinally and transversally simultaneously in a single plane.

31. An engine turning machine having diamond engraving means, a master pattern plate adapted to direct the movement in engraving a pattern of the diamond engraving means, means for movably supporting said master pattern plate and resilient means for holding said master pattern plate whereby it is movable in different directions in a single plane.

32. An engine turning machine including diamond engraving means, means for reciprocating said diamond engraving means back and forth, spring means for holding said diamond engraving means in engagement in operating position during one movement of reciprocation and means for holding said diamond engraving means out of operating position in the other movement of reciprocation.

33. An engine turning machine, pencil barrel supporting means, means for rotating said pencil barrels, diamond engraving means, means for reciprocating said engraving means, and means for timing the rotation of said pencil barrels in relation to the reciprocation of said diamond engraving means.

34. An engine turning machine including a pencil barrel supporting means, means for rotating the pencil barrels, a diamond engraving means, means for reciprocating said diamond engraving means along said barrels, means for holding said engraving means out of operating position during the movement of reciprocation in one direction, means for holding said diamond engraving means out of engaging position at the extent of movement in either direction and timing means for causing said pencil barrels to be rotated at the time when said engraving means is out of operating position just prior to movement into operating position.

35. An engine turning machine including, engraving means, means for reciprocating said engraving means, means for releasing said engraving means to engrave a line at a time at each reciprocation and means for automatically timing and spacing the lines engraved in the operation of said machine.

36. An engine turning machine including a series of diamond engraving points, a pencil barrel supporting means, means for reciprocating said diamond points, means for holding said points out of engagement in movement in one direction of reciprocation, means for rotating the pencil barrels supported therein, means for timing the movement of the pencil barrels, a master pattern plate, a tracing finger for directing the diamond engraving points on the pencil barrels and means for automatically moving said master pattern plate longitudinally and transversely in a single plane by said timing means.

37. An engine turning machine including a segmental flat master pattern plate for a design, the segments of which are adapted to be held collectively to form a single flat unit, means for moving said unit a degree at a time in a flat plane, a tracer for said master pattern plate adapted to engage the engraving on said segments in a manner so that when said master pattern unit is moved a step at a time the tracer will engage the engraving on the next adjacent segment, said unit representing the entire pattern to be engine turned.

38. An engine turning machine including, engine turning engraving means, a master design plate made up of a series of members clamped adjacent each other and separable from each other in a manner so that different designs can be arranged with a series of segments which make up the complete master design plate in a single unit.

39. A master pattern plate for an engine turning machine including, a series of separable segments and means for clamping said segments together.

40. An engine turning machine including, engine engraving means, means for operating said engraving means, a tracer member connected with said engraving means including a pattern tracing finger, a master pattern plate adapted to be engaged by said finger and made up of a series of separable segments and means for clamping said segments together to form the complete single unit master pattern plate which is movable longitudinally and transversely in a single plane.

41. An engine turning machine including, a master pattern design plate, engraving means, timing means and means for simultaneously shifting said master pattern plate and said engraving means in two distinct directions at the same time in the operation of said engine turning machine.

42. An engine turning machine including, a pencil barrel supporting means, means for rotating the pencil barrels, a series of diamond engraving points, means for reciprocating said engraving points along said barrels, a flat master pattern plate adapted to direct the operating movement of said points and means for moving said master pattern plate longitudinally and transversely simultaneously in a single plane.

43. An engine turning machine including means for supporting a series of articles to be engine turned, a series of diamond points, a flat master pattern plate movable longitudinally and transversely, means for connecting said diamond points and said flat master pattern plate, and a cam adapted to regulate the movement of said master pattern plate.

FRANK J. KRISTOFEK.
WALTER F. BENSON.